US006949688B2

(12) United States Patent
Goze et al.

(10) Patent No.: US 6,949,688 B2
(45) Date of Patent: Sep. 27, 2005

(54) LOW NOACK VOLATILITY POLY α-OLEFINS

(75) Inventors: Maria Caridad B. Goze, East Brunswick, NJ (US); Norman Yang, Westfield, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/959,544

(22) Filed: Oct. 6, 2004

(65) Prior Publication Data

US 2005/0045527 A1 Mar. 3, 2005

Related U.S. Application Data

(62) Division of application No. 09/860,142, filed on May 17, 2001, now Pat. No. 6,824,671.

(51) Int. Cl.[7] .............................................. C07C 2/26
(52) U.S. Cl. ...................... 585/525; 585/521; 585/329
(58) Field of Search ............................... 585/329, 521, 585/525

(56) References Cited

U.S. PATENT DOCUMENTS

| | | |
|---|---|---|
| 1,815,022 A | 7/1931 | Davis |
| 2,015,748 A | 10/1935 | Frolich |
| 2,191,498 A | 2/1940 | Reiff |
| 2,387,501 A | 10/1945 | Dietrich |
| 2,443,264 A | 6/1948 | Mikeska |
| 2,471,115 A | 5/1949 | Mikeska |
| 2,500,166 A | 7/1950 | Seger et al. |
| 2,526,497 A | 10/1950 | Mikeska |
| 2,591,577 A | 4/1952 | McDermott |
| 2,655,479 A | 10/1953 | Munday et al. |
| 2,666,746 A | 1/1954 | Munday et al. |
| 2,719,125 A | 9/1955 | Roberts |
| 2,719,126 A | 9/1955 | Fields et al. |
| 2,721,877 A | 10/1955 | Popkin et al. |
| 2,721,878 A | 10/1955 | Popkin |
| 2,817,693 A | 12/1957 | Koome et al. |
| 3,036,003 A | 5/1962 | Verdol |
| 3,087,932 A | 4/1963 | Little, Jr. |
| 3,087,936 A | 4/1963 | Le Suer |
| 3,149,178 A | 9/1964 | Hamilton et al. |
| 3,172,892 A | 3/1965 | Le Suer et al. |
| 3,200,107 A | 8/1965 | Le Suer |
| 3,215,707 A | 11/1965 | Rense |
| 3,219,666 A | 11/1965 | Norman et al. |
| 3,250,715 A | 5/1966 | Wyman |
| 3,254,025 A | 5/1966 | Le Suer |
| 3,272,746 A | 9/1966 | Le Suer et al. |
| 3,275,554 A | 9/1966 | Wagenaar |
| 3,316,177 A | 4/1967 | Dorer, Jr. |
| 3,322,670 A | 5/1967 | Burt et al. |
| 3,329,658 A | 7/1967 | Fields |
| 3,341,542 A | 9/1967 | Le Suer et al. |
| 3,382,291 A | 5/1968 | Brennan |
| 3,413,347 A | 11/1968 | Worrel |
| 3,438,757 A | 4/1969 | Honnen et al. |
| 3,444,170 A | 5/1969 | Norman et al. |
| 3,449,250 A | 6/1969 | Fields |
| 3,454,555 A | 7/1969 | van der Voort et al. |
| 3,454,607 A | 7/1969 | Le Suer et al. |
| 3,519,565 A | 7/1970 | Coleman |
| 3,541,012 A | 11/1970 | Stuebe |
| 3,565,804 A | 2/1971 | Honnen et al. |
| 3,576,898 A | 4/1971 | Blake |
| 3,630,904 A | 12/1971 | Musser et al. |
| 3,632,511 A | 1/1972 | Liao |
| 3,652,616 A | 3/1972 | Watson et al. |
| 3,666,730 A | 5/1972 | Coleman |
| 3,687,849 A | 8/1972 | Abbott |
| 3,697,574 A | 10/1972 | Piasek et al. |
| 3,702,300 A | 11/1972 | Coleman |
| 3,703,536 A | 11/1972 | Piasek et al. |
| 3,704,308 A | 11/1972 | Piasek et al. |
| 3,725,277 A | 4/1973 | Worrel |
| 3,725,480 A | 4/1973 | Traise et al. |
| 3,726,882 A | 4/1973 | Traise et al. |
| 3,742,082 A | 6/1973 | Brennan |
| 3,751,365 A | 8/1973 | Piasek et al. |
| 3,755,433 A | 8/1973 | Miller |
| 3,756,953 A | 9/1973 | Piasek et al. |
| 3,763,244 A | 10/1973 | Shubkin |
| 3,769,363 A | 10/1973 | Brennan |
| 3,770,854 A | 11/1973 | Morris et al. |
| 3,780,128 A | 12/1973 | Shubkin |
| 3,787,374 A | 1/1974 | Adams |
| 3,798,165 A | 3/1974 | Piasek et al. |
| 3,803,039 A | 4/1974 | Piasek et al. |
| 3,822,209 A | 7/1974 | Knapp et al. |
| 3,876,720 A | 4/1975 | Heilman et al. |
| 3,948,800 A | 4/1976 | Meinhardt |

(Continued)

FOREIGN PATENT DOCUMENTS

| | | |
|---|---|---|
| EP | 168 534 | 1/1986 |
| EP | 464 547 | 1/1992 |

(Continued)

OTHER PUBLICATIONS

Hans Dressler, "Alkylated Aromatics", Synthetic Lubricants and High–Performance Functional Fluids, R.L. Shubkin, ed., Chapter 5, pp. 125–144, 1993.

(Continued)

Primary Examiner—Thuan D Dang
(74) Attorney, Agent, or Firm—Andrew B. Griffis

(57) ABSTRACT

The present invention relates to poly α-olefins (PAO's) which exhibit superior Noack volatility at low pour points. Mixtures of 1-decene and 1-dodecene are polymerized using an alcohol promoted $BF_3$ in conjunction with a combination of cocatalysts. The reaction mixture is distilled to remove the unreacted monomeric and dimeric species. The resulting product is then hydrogenated to saturate the oliogomers to provide a hydrogenated product which has a viscosity of 5 cSt. This product is distilled to provide PAO's of varying viscosity grades. The 4 cSt PAO is comprised mostly of trimers and tetramers while the 6 cSt product is comprised of trimers, tetramers, and pentamers.

23 Claims, No Drawings

U.S. PATENT DOCUMENTS

| | | |
|---|---|---|
| 3,965,018 A | 6/1976 | Heilman et al. |
| 4,032,591 A | 6/1977 | Cupples et al. |
| 4,045,507 A | 8/1977 | Cupples et al. |
| 4,045,508 A * | 8/1977 | Cupples et al. ............. 585/511 |
| 4,100,082 A | 7/1978 | Clason et al. |
| 4,172,855 A | 10/1979 | Shubkin et al. |
| 4,218,330 A | 8/1980 | Shubkin |
| 4,234,435 A | 11/1980 | Meinhardt et al. |
| 4,239,930 A | 12/1980 | Allphin et al. |
| 4,367,352 A | 1/1983 | Watts, Jr. et al. |
| 4,405,507 A | 9/1983 | Carr et al. |
| 4,405,508 A | 9/1983 | Eckel |
| 4,409,415 A | 10/1983 | Morganson et al. |
| 4,413,156 A | 11/1983 | Watts, Jr. et al. |
| 4,426,305 A | 1/1984 | Malec |
| 4,436,947 A | 3/1984 | Morganson et al. |
| 4,454,059 A | 6/1984 | Pindar et al. |
| 4,501,678 A | 2/1985 | Katayama et al. |
| 4,594,172 A | 6/1986 | Sie |
| 4,604,491 A | 8/1986 | Dressler et al. |
| 4,658,072 A | 4/1987 | Johnson |
| 4,714,794 A | 12/1987 | Yoshida et al. |
| 4,758,362 A | 7/1988 | Butke |
| 4,767,551 A | 8/1988 | Hunt et al. |
| 4,798,684 A | 1/1989 | Salomon |
| 4,827,064 A | 5/1989 | Wu |
| 4,827,073 A | 5/1989 | Wu |
| 4,897,178 A | 1/1990 | Best et al. |
| 4,910,355 A | 3/1990 | Shubkin et al. |
| 4,914,254 A | 4/1990 | Pelrine |
| 4,921,594 A | 5/1990 | Miller |
| 4,926,004 A | 5/1990 | Pelrine et al. |
| 4,943,672 A | 7/1990 | Hamner et al. |
| 4,956,122 A | 9/1990 | Watts et al. |
| 4,967,032 A | 10/1990 | Ho et al. |
| 4,975,177 A | 12/1990 | Garwood et al. |
| 5,034,141 A | 7/1991 | Beltzer et al. |
| 5,034,142 A | 7/1991 | Habeeb et al. |
| 5,055,626 A | 10/1991 | Ho et al. |
| 5,068,487 A | 11/1991 | Theriot |
| 5,084,197 A | 1/1992 | Galic et al. |
| 5,110,445 A | 5/1992 | Chen et al. |
| 5,135,638 A | 8/1992 | Miller |
| 5,246,566 A | 9/1993 | Miller |
| 5,264,116 A | 11/1993 | Apelian et al. |
| 5,275,719 A | 1/1994 | Baker, Jr. et al. |
| 5,288,395 A | 2/1994 | Marler et al. |
| 5,302,279 A | 4/1994 | Degnan et al. |
| 5,344,578 A | 9/1994 | Wei et al. |
| 5,358,628 A | 10/1994 | Apelian et al. |
| 5,362,378 A | 11/1994 | Borghard et al. |
| 5,371,248 A | 12/1994 | Rudnick |
| 5,395,538 A | 3/1995 | Rudnick et al. |
| 5,468,368 A | 11/1995 | Baker, Jr. et al. |
| 5,552,071 A | 9/1996 | Rudnick et al. |
| 5,565,086 A | 10/1996 | Cody et al. |
| 5,602,086 A | 2/1997 | Le et al. |
| 5,643,440 A | 7/1997 | Borghard et al. |
| 5,693,598 A | 12/1997 | Abraham et al. |
| 5,705,458 A | 1/1998 | Roby et al. |
| 5,885,438 A | 3/1999 | Apelian et al. |
| 6,034,039 A | 3/2000 | Gomes et al. |
| 6,080,301 A | 6/2000 | Berlowitz et al. |
| 6,646,174 B2 | 11/2003 | Clarembeau |
| 2004/0033908 A1 | 2/2004 | Deckman et al. |

FOREIGN PATENT DOCUMENTS

| | | |
|---|---|---|
| EP | 321 302 | 5/1992 |
| EP | 321 304 | 5/1993 |
| EP | 496 486 | 3/1994 |
| EP | 0 468 109 B1 | 11/1994 |
| EP | 471 071 | 8/1995 |
| EP | 710 710 | 5/1996 |
| EP | 815 187 | 1/1998 |
| GB | 1350257 | 4/1974 |
| GB | 1390359 | 4/1975 |
| GB | 1429494 | 3/1976 |
| GB | 1440230 | 6/1976 |

OTHER PUBLICATIONS

Eapen et al., "Poly n–Alkylbenzene Compounds: A Class of Thermally Stable and Wide Liquid Range Fluids", ACS Petroleum Chemistry Preprint, pp. 1053–1058, 1984.

American Society for Testing and Materials, "Standard Test Methods for Pour Point of Petroleum Products (Automatic Tilt Method)[1]," *ASTM Designation: D 5950–96*, pp. 1–12, Jun., 1996.

American Society for Testing and Materials, "Standard Test Method for Evaporation Loss of Lubricating Oils the Noack Method)[1]," *ASTM Designation: D 5800–00*, pp. 1–12, Jul., 2000.

Brennan, James H., "Wide–Temperature Range Synthetic Hydrocarbon Fluids", *Chemistry of Synthetic Lubricants and Additives, H.V. Lawther 178th National Meeting of American Chemical Society*, Washington, D.C., Sep. 1979.

James, B.D., et al, *Process Variables in the Manufacture of Polyalphaolefins*, Bracknell England, vol. 5–3, pp. 187–196.

* cited by examiner

LOW NOACK VOLATILITY POLY α-OLEFINS

CROSS REFERENCE TO RELATED APPLICATIONS

This application is a Divisional Application of U.S. application Ser. No. 09/860,142, filed May 17, 2001, now U.S. Pat. No. 6,824,671.

FIELD OF THE INVENTION

This invention belongs to the field of lubricants. More particularly, this invention relates to certain improved poly α-olefins prepared from a mixed feed of olefins.

BACKGROUND OF THE INVENTION

Poly α-olefins comprise one class of hydrocarbon lubricants which has achieved importance in the lubricating oil market. These materials are typically produced by the polymerization of α-olefins typically ranging from 1-octene to 1-dodecene, with 1-decene being a preferred material, although polymers of lower olefins such as ethylene and propylene may also be used, including copolymers of ethylene with higher olefins, as described in U.S. Pat. No. 4,956,122 and the patents referred to therein. The poly α-olefin (PAO) products may be obtained with a wide range of viscosities varying from highly mobile fluids of about 2 cSt at 100° C. to higher molecular weight, viscous materials which have viscosities exceeding 100 cSt at 100° C. The PAO's may be produced by the polymerization of olefin feed in the presence of a catalyst such as $AlCl_3$, $BF_3$, or $BF_3$ complexes. Processes for the production of PAO lubricants are disclosed, for example, in the following patents: U.S. Pat. Nos. 3,382,291; 4,172,855; 3,742,082; 3,780,128; 3,149,178; and 4,956,122. The PAO lubricants are also discussed in Lubrication Fundamentals, J. G. Wills, Marcel Dekker Inc., (New York, 1980). Subsequent to the polymerization, the lubricant range products are hydrogenated in order to reduce the residual unsaturation. In the course of this reaction, the amount of unsaturation is generally reduced by greater than 90%.

A major trend in passenger car engine oil usage is the extension of oil drain intervals. Thus, a need exists for low viscosity PAO's which exhibit low Noack volatility. (See ASTM D 5800 Standard Test Method for Evaporation Loss of Lubricating Oils by the Noack Method.)

The properties of a particular grade of PAO are greatly dependent on the α-olefin used to make that product. In general, the higher the carbon number of the α-olefin, the lower the Noack volatility and the higher the pour point of the product.

PAO's having a viscosity of 4 cSt are typically made from 1-decene and have a Noack volatility of 13–14% and pour point of <–60° C. PAO's having a viscosity of 6 cSt are typically prepared from 1-decene or a blend of α-olefins and have a Noack volatility of about 7.0% and pour point of about –60° C.

SUMMARY OF THE INVENTION

The present invention relates to poly α-olefins (PAO's) which exhibit superior Noack volatility, while maintaining good low temperature properties. Mixtures of 1-decene and 1-dodecene are polymerized using $BF_3$ promoted alcohol/ester mixture. The reaction mixture is distilled to remove the unreacted monomeric and dimeric species. The resulting product is hydrogenated to saturate the oligomers, to provide a product having a viscosity of 5 cSt. This product is distilled and distillation cuts blended to provide PAO's of varying viscosity grades. The 4 cSt PAO is comprised mostly of trimers and tetramers while the 6 cSt is comprised of trimers, tetramers, and pentamers.

DETAILED DESCRIPTION OF THE INVENTION

In one aspect, the present invention provides a process for preparing a lubricant, which comprises (a) oligomerizing an α-olefin feed, wherein said feed is comprised of 50 to 80 weight percent of 1-decene and 50 to 20 weight percent of 1-dodecene, in the presence of $BF_3$ and at least two different cocatalysts, wherein said cocatalysts are selected from groups (i) and (ii):

(i) alcohols and
(ii) alkyl acetates, provided that at least one cocatalyst is from group (i) and at least one cocatalyst is from group (ii); followed by (b) hydrogenation of at least a portion of residual unsaturation.

In the above process, it is preferred that the α-olefin feed consists essentially of 50 to 80 weight percent of 1-decene and 50 to 20 weight percent of 1-dodecene, with 55 to 75 weight percent of 1-decene and 45 to 25 weight percent of 1-dodecene being more preferred. We have found that a combination of cocatalysts (or promoters), one cocatalyst selected from the class of alcohols, i.e., compounds having one hydroxyl functional group, preferably $C_1$–$C_{10}$ alcohols, more preferably $C_1$–$C_6$ alcohols, and at least one cocatalyst selected from alkyl acetates, preferably $C_1$–$C_{10}$ alkyl acetates, more preferably $C_1$–$C_6$ alkyl acetates, provides oligomers which possess desired distributions and physical properties. In this regard, we have found that PAO's prepared from either group (i) or (ii) alone exhibit low product yields.

In this process, it is preferred that the ratio of the group (i) cocatalysts to group (ii) cocatalysts range from about 0.2 to 15, (i.e., (i):(ii)) with 0.5 to 7 being preferred.

Preferred $C_1$–$C_6$ alcohols include methanol, ethanol, n-propanol, n-butanol, n-pentanol, and n-hexanol.

Preferred $C_1$–$C_6$ alkyl acetates include methyl acetate, ethyl acetate, n-propyl acetate, n-butyl acetate, and the like.

We have found that, surprisingly, the products of this process possess a good balance of properties, especially low Noack volatility and pour point. Thus, in a preferred embodiment, the present invention provides a lubricant which possesses a Noack volatility of about 4 to 12% weight loss, alternatively 6 to 10% weight loss, as determined by a modified ASTM D5800 method, and a pour point of about –40° C. to –65° C., alternatively –50° to –58° C., as determined by a modified ASTM D5950 method;

wherein said modified ASTM D5800 method is an ASTM D5800 method with the exception that thermometer calibration is performed annually;

and wherein said modified ASTM D5950 method is an ASTM D5950 method with the exception that the sample to be tested is not heated prior to performing said method.

In this regard, the modified ASTM D5800 method is the same as the ASTM D5800 method, with the exception that the thermometer calibration is performed annually rather than biannually. The modified ASTM D5950 method is the same as the ASTM D5950 method with the exception that the sample to be tested is not heated prior to performing said method. In particular, the preliminary preheat of the test specimen, as set forth in 11.3.1 and 11.3.2, in ASTM D 5950, is not followed.

The oligomerized α-olefins of the present invention are preferably subjected to hydrogenation using conventional hydrogenation methodology to reduce at least a portion of the residual unsaturation which remains after the oligomerization. In this regard, typical hydrogenation catalysts such as Pd, Pt, Ni, etc., can be utilized. In the hydrogenation step, it is preferred that at least about 90% of the residual unsaturation be reduced. The lubricants thus provided may be utilized as is in lubricant applications or may be formulated with other conventional lubricants. Accordingly, in another aspect, the present invention provides a lubricant composition comprising (a) a conventional lubricant; and
(b) at least one lubricant comprised of an oligomerized α-olefin which has been subjected to hydrogenation, wherein said oligomerized α-olefin is prepared from an olefin feed comprised of 50 to 80 weight percent of 1-decene and 50 to 20 weight percent 1-dodecene, wherein said oligomerized α-olefin exhibits a Noack volatility of about 4 to 12% weight loss, as determined by as determined by a modified ASTM D5800 method, and a pour point of about −40° C. to −65° C. as determined by a modified ASTM D5950 method;

wherein said modified ASTM D5800 method is an ASTM D5800 method with the exception that thermometer calibration is performed annually;

and wherein said modified ASTM D5950 method is an ASTM D5950 method with the exception that the lubricant to be tested is not heated prior to performing said method.

In the above lubricant compositions, suitable conventional lubricants include known synthetic and natural lubricants which may form a major or minor portion of the overall lubricant composition and their choice and quantity can be tailored to meet desired end-use criteria. (See, for example, *Synthetic Lubricants and High-Performance Functional Fluids*, Ed. Ronald L. Shubkin, Marcel Dekker, Inc., (New York, 1993).

The oligomerization reaction can be conducted in a single or multiple stage process to produce a mixture of dimer, trimer, tetramer, and pentamer products. As is shown below in the experimental section, the product of the oligomerization reaction is desirably subjected to fractional distillation to afford products via blending having 4, 5, and 6 cSt.

Boron trifluoride is used as the catalyst in the process of the present invention along with a combination of cocatalysts. As noted above, we have found that surprisingly, when one selects at least one catalyst from the classes of alcohols and at least one selected from alkyl acetates, followed by conventional hydrogenation, a lubricant having a superior balance of properties results. The cocatalyst complexes with the boron trifluoride to form a coordination compound which is catalytically active. In a preferred embodiment, the cocatalyst is used in an amount of from about 0.01 to about 10 weight percent, based on the weight of the α-olefin feed, most preferably about 0.1 to 6 weight percent.

As to the boron trifluoride, it is preferred that it be introduced into the reactor simultaneously with cocatalysts and olefin feed. It is further preferred that the reaction zone contains an excess of boron trifluoride, which is governed by the pressure and partial pressure of the boron trifluoride. In this regard, it is preferred that the boron trifluoride be maintained in the reaction zone at a pressure of about 2 to about 500 psig, preferably about 2 to 50 psig. Alternatively, the boron trifluoride can be sparged into the reaction mixture, along with other known methods for introducing the boron trifluoride to the reaction zone.

Suitable temperatures for the reaction are also conventional and can vary from about −20° C. to about 90° C., with a range of about 15° to 70° C. being preferred.

Further details regarding suitable conventional processing methodologies can be found in U.S. Pat. No. 4,045,507, incorporated herein by reference, and in *Synthetic Lubricants and High-Performance Functional Fluids*, Ed. Ronald L. Shubkin, Marcel Dekker, Inc., (New York, 1993).

EXPERIMENTAL SECTION

EXAMPLE 1

A 1-decene and 1-dodecene mixture containing 70 weight percent 1-decene and 30 weight percent 1-dodecene was oligomerized in two continuous stirred-tank reactors in series at 18° C. and 5 psig using $BF_3$ promoted with a 12:1 mole ratio mixture of ethanol and ethyl acetate at a total catalyst concentration of 3.5 weight percent. When a steady-state condition was attained, a sample was distilled to remove the monomers and dimers. The bottoms stream was hydrogenated to saturate the trimers/oligomers. The hydrogenated product is 5 cSt PAO. A sample of this hydrogenated product was distilled and distillation cuts blended to produce different viscosities of PAO. The 4 cSt PAO contained mostly trimers and tetramers while the 6 cSt PAO trimers, tetramers, and pentamers. The properties of the final 4 cSt, 5 cSt and 6 cSt PAO products as well as those of the 1-decene and 1-dodecene based references are shown in Tables 1, 2, and 3 below. The Noack volatility of each product is significantly lower than that of the $C_{10}$ based reference oil. However, the pour points are higher than those of the corresponding $C_{10}$-based reference oils but are well within desired specifications. Both the 1-dodecene based 5 cSt and 6 cSt PAO's have pour points that do not meet desired specifications.

EXAMPLE 2

Similar to Example 1, except that the olefin mixture contained 60 weight percent 1-decene and 40 weight percent 1-dodecene was oligomerized using $BF_3$ promoted with a 3.5:1 mole ratio mixture of butanol and n-butyl acetate, at a total catalyst concentration of 5.3 weight percent. With the incorporation of more 1-dodecene in the feed mixture, the Noack volatility of each product was further reduced. The pour points are either the same or higher than those of the products made from 70/30 1-decene/1-dodecene mix.

EXAMPLE 3

Similar to Example 1, except that the olefin mixture contained 50 weight percent 1-decene and 50 weight percent 1-dodecene was oligomerized using $BF_3$ promoted with a 4:1 mole ratio mixture of n-butanol and n-butyl acetate at a total catalyst concentration of 1.8 weight percent. Again, the Noack volatility of each product decreased with the increase of 1-dodecene content of the feed mixture.

TABLE 1

Properties of 4cSt PAO

| Example No. | Feed $C_{10}:C_{12}$ | 100° C. Vis. CSt | −40° C. Vis cSt | VI | Noack Vol. wt % | Pour Point ° C. |
|---|---|---|---|---|---|---|
| Reference A | 100:0 | 4.10 | 2850 | 122 | 13.5 | <−60 |
| 1 | 70:30 | 4.10 | 2899 | 128 | 11.7 | −60 |
| 2 | 60:40 | 4.09 | 2680 | 130 | 10.6 | −60 |
| 3 | 50:50 | 4.15 | 2930 | 134 | 9.9 | — |

TABLE 2

Properties of 5cSt PAO

| Example No. | Feed C$_{10}$:C$_{12}$ | 100° C. Vis. CSt | -40° C. Vis cSt | VI | Noack Vol. wt % | Pour Point ° C. |
|---|---|---|---|---|---|---|
| Reference B | 100:0 | 5.05 | 4911 | 135 | 8.9 | <-56 |
| 1 | 70:30 | 5.10 | 5272 | 136 | 7.7 | -56 |
| 2 | 60:40 | 5.00 | 4520 | 139 | 7.5 | -54 |
| 3 | 50:50 | 5.00 | 4346 | 140 | 6.4 | — |
| Reference C | 0:100 | 5.25 | 4647 | 148 | 4.8 | -45 |

TABLE 3

Properties of 6 cSt PAO

| Example No. | Feed C$_{10}$:C$_{12}$ | 100° C. Vis. CSt | -40° C. Vis cSt | VI | Noack Vol. wt % | Pour Point ° C. |
|---|---|---|---|---|---|---|
| Reference D | 100:0 | 5.9 | 7906 | 138 | 6.8 | -59 |
| 1 | 70:30 | 5.89 | 7817 | 140 | 5.3 | -56 |
| 2 | 60:40 | 5.90 | 7400 | 140 | 5.0 | -54 |
| 3 | 50:50 | 5.86 | 6607 | 143 | 4.3 | — |
| Reference E | 0:100 | 6.20 | 8150 | 146 | 4.0 | -42 |

While the invention has been described and illustrated with reference to certain preferred embodiments thereof, those skilled in the art will appreciate that various changes, modifications and substitutions can be made therein without departing from the spirit and scope of the invention.

We claim:

1. A process for preparing a lubricant, which comprises
   (a) oligomerizing an α-olefin feed, wherein said feed is comprised of 50 to 80 weight percent of 1-decene and 50 to 20 weight percent of 1-dodecene, in the presence of BF$_3$ and at least two different cocatalysts, wherein said cocatalysts are selected from groups (i) and (ii):
      (i) alcohols and
      (ii) alkyl acetates,
      provided that at least one cocatalyst is from group (i) and at least one cocatalyst is from group (ii); followed by
   (b) hydrogenation of at least a portion of residual unsaturation,
   wherein the lubricant possesses a Noack volatility of about 4 to 12% weight loss, as determined by a modified ASTM D5800 method, and a pour point of about -40° C. to -65° C., as determined by a modified ASTM D5950 method, wherein said modified ASTM D5800 method is an ASTM D5800 method, with the exception that thermometer calibration is preformed annually, and wherein said modified ASTM D5950 method is an ASTM D5950 method, with the exception that the lubricant to be tested is not heated prior to performing said method.

2. The process of claim 1, wherein groups (i) and (ii) are selected from C$_1$–C$_{10}$ alcohols and C$_1$–C$_{10}$ alkyl acetates.

3. The process of claim 1, wherein groups (i) and/or (ii) are selected from C$_1$–C$_6$ alcohols and C$_1$–C$_6$ alkyl acetates.

4. The process of claim 1, wherein the C$_{1-C10}$ alcohols are selected from ethanol, n-propanol, n-butanol, n-pentanol, and n-hexanol.

5. The process of claim 1, wherein the cocatalyst is comprised of ethanol and ethyl acetate.

6. The process of claim 1, wherein the cocatalyst is comprised of n-butanol and n-butyl acetate.

7. The process of claim 1, wherein the Noack volatility is 5 to 11% weight loss.

8. The process of claim 1, wherein the pour point is -45° C. to -60 C.

9. The process of claim 1, wherein the feed is comprised of 55 to 75 weight percent of 1-decene and 1-dodecene and 45 to 25 weight percent 1-dodecene.

10. The process of claim 1, further comprising the step of subjecting said lubricant to distillation to afford a fraction having a viscosity of about 4 cSt and/or a fraction having a viscosity of about 6 cSt.

11. The process of claim 10, wherein the 4 cSt fraction possesses a Noack volatility of 9 to 15% weight loss.

12. The process of claim 10, wherein the 4 cSt fraction exhibits a pour point of -45° C. to -65° C.

13. The process of claim 10, wherein the 6 cSt fraction possesses a Noack volatility of 3 to 10% weight loss.

14. The process of claim 10, wherein the 6 cSt fraction exhibits a pour point of -40° C. to -60° C.

15. The process of claim 1, wherein the cocatalyst is used in an amount of from about 0.01 to about 10 weight percent, based on the weight of the α-olefin feed, and wherein the ratio of the group (i) cocatalyst to group (ii) cocatalyst ranges from about 0.2 to 15.

16. A process for preparing a lubricant, which comprises
   (a) oligomerizing an α-olefin feed, wherein said feed consists essentially of about 50 to 80 weight percent of 1-decene and 1-dodecene and 50 to 20 weight percent 1-dodecene, in the presence of BF$_3$ and at least two different cocatalysts, wherein said cocatalysts are selected from the groups (i) and (ii):
      (i) alcohols and
      (ii) alkyl acetates, provided that at least one cocatalyst is from group (i) and at least one cocatalyst is from group (ii); followed by
   (b) hydrogenation of at least a portion of residual unsaturation. wherein the lubricant possesses a Noack volatility of about 6 to 10% weight loss, as determined by a modified ASTM D5800 method, and a pour point of about -50° C. to -58° C. as determined by a modified ASTM D5950 method; wherein said modified ASTM D5800 method is an ASTM D5800 method with the exception that thermometer calibration is performed annually; and wherein said modified ASTM D5950 method is an ASTM D5950 method with the exception that the lubricant to be tested is not heated prior to performing said method.

17. The process of claim 16, wherein at least 90 percent of residual unsaturation is hydrogenated.

18. The process of claim 16, wherein groups (i) and (ii) are selected from C$_1$–C$_{10}$ alcohols and C$_1$–C$_{10}$ alkyl acetates.

19. The process of claim 16, wherein groups (i) and (ii) are selected from C$_1$–C$_6$ alcohols and C$_1$–C$_6$ alkyl acetates.

20. The process of claim 16, wherein the C$_1$–C$_6$ alcohols are selected from ethanol, n-propanol, n-butanol, n-pentanol, and n-hexanol.

21. The process of claim 16, wherein the cocatalyst is comprised of ethanol and ethyl acetate.

22. The process of claim 16, wherein the cocatalyst is comprised of n-butanol and n-butyl acetate.

23. The process of claim 16, wherein the feed consists essentially of 55 to 75 weight percent of 1-decene and 1-dodecene and 45 to 25 weight percent 1-dodecene.

* * * * *